United States Patent Office 3,397,172
Patented Aug. 13, 1968

3,397,172
PROCESS FOR THE PREPARATION OF POLYACRO-
LEIN GELS AND PROCESS FOR IMPROVING THE
PROPERTIES AND SEALING OF SOILS, SOIL FOR-
MATIONS, STRUCTURES, STRUCTURAL ELE-
MENTS AND STRUCTURAL MATERIALS
Wilhelm Alfons Schuler, Bad Homburg vor der Hohe,
Erich Bäder and Karl-Heinz Rink, Hanau am Main,
and Wolfgang Weigert, Offenbach am Main, Germany,
assignors to Deutsche Gold- und Silber-Scheideanstalt
vormals Roessler, Frankfurt am Main, Germany
No Drawing. Filed Feb. 17, 1964, Ser. No. 345,094
Claims priority, application Germany, Feb. 16, 1963,
D 40,906; Sept. 6, 1963, D 42,418
34 Claims. (Cl. 260—41)

ABSTRACT OF THE DISCLOSURE

Gels are produced from polymers of acrolein having a molecular weight of at least $1 \times 10^3$ and containing at least 0.1 wt. percent of $SO_2$ in the form of $SO_3H$ or $SO_3M$ groups, M being alkali or alkaline earth metal or ammonium, obtained either (1) by polymerization of an acrolein with the aid of an adduct of a polymer and a sulfurous acid compound as catalyst, or (2) by polymerization of acrolein with $SO_2$, if desired in the present of an inert medium, followed by a curing time, or (3) by polymerization of acrolein with a radical or ionic catalyst free of $SO_2$ or alkali metal or alkaline earth metal bisulfite and treatment with $SO_2$ or alkali metal or alkaline earth metal bisulfite followed by a curing time, by treatment of such polymers in an inert medium such as water or alcohols with a basic substance such as alkali metal and alkaline earth metal hydroxides, alkali metal carbonates, tertiary alkali metal phosphates, and amines. Use of such gels to reduce water permeability of water permeable but water insoluble porous solid material.

---

It is known that polyacroleins which were prepared by the polymerization of the carbon-carbon-double bond have also reactive aldehyde groups which are subject to a Cannizzaro-reaction by alkalines in an inert medium, for instance in aqueous $SO_2$-solutions (DBP 1,054,714, R. C. Schulz in Kunststoffe Plastics 1959/1, U.S. Patent 3,079,280). Solutions of the polymeric polyhydroxy polycarboxylic acids are formed, respectively their salts.

It was found that gels of polyacroleins may be prepared by the admixture of an alkaline substance to a polyacrolein of the molecular weight of at least $1 \times 10^3$, preferably from $1 \times 10^4$ to $2 \times 10^6$ and which contains at least 0.1%-weight $SO_2$ in form of $SO_3H$ or $SO_3M$ groups which are located at the aldehyde groups of the polyacrolein (M=alkali metal-, ammonium-, and alkaline earth metal ions). The reaction is carried out in an inert medium which contains at least 6% by weight of polyacrolein.

A polyacrolein, having a molecular weight of at least $1 \times 10^3$ preferably from $1 \times 10^4$ to $2 \times 10^6$ and containing 0.1 by weight $SO_2$ in form of $SO_3H$- or $SO_3M$ groups which are combined with the aldehyde groups, may be prepared in the following ways:

(1) Freshly distilled acrolein is polymerized in an inert medium together with polymer-$SO_2$-, or an alkali-, or an alkaline earth bisulfite adduct, as it was described and claimed in copending patent application Ser. No. 199,902, filed June 4, 1962, now Patent No. 3,313,750 and so much of the disclosure of this application relative to the preparation of the acrolein polymers is incorporated into this application. The application is a C.I.P.-application of U.S. S.N. 132,560, filed Aug. 21, 1961. German Prior. Aug. 25, 1960, now abandoned. For instance, the polymer-$SO_2$ adducts may be prepared from: cellulose esters, polyacroleins, polyvinyl carbazole, polyvinylamine, gelatine, polyvinylalcohol, polyglycol, cellulose polyethers, polyguanidines, polyvinyl pyrrolidones. The polymers have a molecular weight of $1 \times 10^3$ to $2 \times 10^6$, preferably from $1 \times 10^4$ to $5 \times 10^5$.

The polyacrolein, which was prepared by this method has generally a molecular weight between $1 \times 10^4$ and $2 \times 10^6$. It is obtained as a solid, if the polymer-$SO_2$-adduct has been used immediately after its preparation. The solid polyacrolein is filtrated off, washed with water and/or lower aliphatic saturated primary alcohols, for instance methanol, ethanol, propanol and/or converted into a slurry with inert organic media, preferably with lower aliphatic saturated primary alcohols, for instance methanol, ethanol, propanol. The basic substances may be admixed to this slurry. It is also possible to add the base directly to the batch after polymerization without previous processing.

If the polymer $SO_2$-adduct was not used immediately after its preparation, but aged for a certain period of time, for instance over a period of ½ to 3 hours at 50° to 80° C. (at room temperature the ageing takes longer), polyacrolein will be obtained as an emulsion and may be mixed directly with the bases.

(2) Freshly distilled acrolein is polymerized with $SO_2$, eventually in the presence of an inert medium, as it was described and claimed in the U.S. Patent No. 3,068,203 and so much of the disclosure of this patent relative to the preparation of the acrolein polymers is incorporated into this application. The polyacrolein is obtained as a solid and may be filtered off and processed as described in section 1.

(3) Freshly distilled acrolein is polymerized with catalysts which are free of $SO_2$, or alkali-, or alkaline-earthmetal bisulfite, eventually in the presence of an inert medium. Polyacrolein is obtained as a solid and may be processed as described in section 1.

Catalysts which are free of $SO_2$ and bisulfite, may be the popular radical catalysts as there are peroxides (for instance benzoylperoxide, tertiary alkylperoxides, hydrogenperoxide), persulfate (for instance alkalipersulfate), azo-compounds (for instance azoisobutyronitrile) and redox systems as published, for instance by R. C. Schulz et al. in Makromolekulare Chemie 24 (1957) page 141 to 151. Also ionic catalysts may be used, for instance weak anionic catalysts like piperidine.

The polyacroleins obtained by this method are free of $SO_3H$- and $SO_3M$-groups, respectively. After they have been processed they will be treated with gaseous or aqueous $SO_2$ or aqueous alkali-, or alkaline earth bisulfite solutions. The reaction may be carried out either directly or after the polyacroleins were suspended in inert media, as there are water, lower aliphatic saturated primary alcohols (methanol, ethanol, propanol) and in mixtures of water and these alcohols of any ratio of these components. It is advantageous to choose such amounts of $SO_2$ or bisulfite, that the content of $SO_2$ in the polyacrolein will be a little bit over 0.1% by weight.

Polyacroleins which were prepared by method 1 from gels immediately after basic substances have been added, as described below. $SO_2$-containing polyacroleins, which were prepared by the methods 2 and 3 have to be kept for a certain period of time, which shall be called curing time. They may be cured as solid substance or in form of their dispersions and solutions. During the curing time the polymer structure is probably subject to a favorable change. However, we do not want to commit ourselves to this explanation of mechanism. The length of the curing time is depending on the temperature. For instance, at 50° C. the curing time is 2 hours, at 70° C. only 0.5 hour.

At room temperature the curing time is even longer accordingly. A procedure which is generally suitable to determine the curing time is to draw samples of the particular polyacrolein, which is suspended in an inert medium, and to mix it with a 20% aqueous NaOH. If a gel is formed the curing time has been sufficient. Otherwise the procedure has to be repeated in short intervals of time, for instance every 30 minutes.

Polyacroleins which contain $SO_2$ in form of $SO_3H$- or $SO_3M$-groups and which were prepared according to methods 1 to 3 may be both dispersions and solutions in inert media. In presence of 0.1 to about 50% by weight $SO_2$ (referred to polyacrolein) dispersions will be obtained, if the content of $SO_2$ is over 50% by weight solutions will be obtained. The transition from dispersion to solution is gradual, so that 50% by weight $SO_2$ has to be considered an approximate value only. Already below this value some polymer may dissolve from its surface, but complete solution occurs in the vicinity of 50% by weight. An amount of 55% by weight of $SO_2$ should be sufficient for complete dissolution in general.

Gels are prepared by admixture of basic substances to $SO_2$-containing polyacroleins which may be in form of their dispersions or solutions in inert media.

The following inert media may be used. Water, lower aliphatic saturated primary alcohols, mixtures of water and these alcohols in any ratio of components.

The following basic substances may be used: Alkali hydroxides including ammonium hydroxide, alkaline earth hydroxides, alkali carbonates including ammonium carbonate, tertiary alkali phosphates; primary secondary, tertiary mono- and diamines. Especially successful turned out to be: NaOH, KOH, $Ca(OH)_2$, $Ba(OH)_2$, $Na_2CO_3$, $K_2CO_3$, tertiary sodiumphosphate, ethylene diamine, piperidine. Their concentration in the reaction mixture should be from 3% to saturation concentration, preferably from 5 to 10% by weight.

Immediately after addition of the bases to the dispersions or solutions of polyacrolein the viscosity of the mixture increases. Within a few minutes, for instance from 20 seconds to 1 hour, a gel has been formed at room temperature. At elevated temperatures, for instance at 50 to 70° C., the gelation time is shorter accordingly. A gel may be obtained also below room temperature. For instance temperatures of −5 to +5° C. the gelation time is approximately 2 hours. The viscosities of these gels are at least 3,000 cp. and are generally 3,000,000 cp., but may be even higher.

The procedures stated above refer to the preparation of gels from homopolymers of acrolein. They also refer to copolymers of acrolein with unsaturated compounds of the ethylene type, as there are: Acryl acid, acrylonitrile, acrylic esters, styrene, methylmethacrylate, vinyl acetate. It was found that the firmness of the gels is decreasing the more unsaturated vinyl compounds have been copolymerized. In general it is impractical to have more than 50% by weight of vinyl compounds in the copolymer. Therefore proportion of vinyl type co-monomers should be below 50% by weight, preferably from 0.1 to 20% by weight.

Example 1

The example illustrates that polyacrolein gels can be prepared in different viscosities.

By reaction of 150 parts of 20% by weight of emulsion polyacrolein mol weight 100,000 at 20° C. with 300 parts of a 7.5% by weight aqueous sodium hydroxide a gel is obtained. 5 minutes after mixing of the components the gel measured with a Heliopath-viscosimeter has a viscosity of 3,000 cp. By reaction of 150 parts of 20% by weight emulsion polyacrolein mol weight 100,000 at 20° C. with 300 parts of 10% by weight aqueous sodium hydroxide gel is obtained. 5 minutes after mixing of the components this gel has measured with a Heliopath-viscosmiter a viscosity of 120,000 cp.

By reaction of 200 parts of 20% by weight emulsion polyacrolein mol weight 100,000 at 20° C. with 200 parts of 20% by weight aqueous sodium hydroxide gel is obtained. 5 minutes after mixing the components with gel has measured with a Heliopath-viscosimeter a viscosity of 700,000 cp.

By reaction of 200 parts of 20% by weight emulsion polyacrolein mol weight 100,000 at 20° C. with 200 parts of 30% by weight aqueous sodium hydroxide gel is obtained. 5 minutes after mixing the components with gel measured with a Heliopath-viscosimeter has a viscosity of 3,000,000 cp.

Example 2

The example illustrates the formation of a gel of an acrolein copolymerization produce and sodium hydroxide.

The copolymerizate is formed as follows: 60 parts acrolein, 15 parts acrylonitrile, 100 parts water, 0.5 part potassium persulfate and 2 parts of an aqueous catalyst solution the solid content of which consists of 15% polyacrolein and 8% $SO_2$ are copolymerized at 60° C. for 2 hours by stirring. It is filtered off, washed and the water containing copolymerizate is used for other reactions.

10 parts of the acrolein/acrylonitrile copolymerizates with a solid content of 20% are mixed with 20 parts of a 10% sodium hydroxide solution. Within 3 minutes a loose pulp is formed of yellowish brown coloured gel particles.

Example 3

The formation of a gel is described from polyacrolein without maturing and sodium hydroxide.

The polyacrolein is prepared as follows: 75 parts acrolein, 100 parts water and 3 parts of an aqueous catalyst solution containing 10% of methyl cellulose (Tylose MH 300) and 6% of $SO_2$ which are stirred for 6 hours at a reaction temperature of 30° C. The obtained polyacrolein is washed and used for other reactions as water containing product.

10 parts of this polyacrolein with a solid content of 20% molecular weight 500,000 are mixed with 20 parts of a 10% aqueous sodium hydroxide. Within 1 minute a pulp of yellowish coloured gel particles is formed.

Example 4

The formation of a gel is described of emulsion polyacrolein without maturing and methanolic potassium hydroxide.

The polyacrolein is formed as follows: 50 parts acrolein, 125 parts of water and 4 parts of an aqueous catalyst solution the solid content of which is consisting to 15% on polyacrolein and 7% on $SO_2$ in defined ageing condition are stirred for 8 hours at a temperature of 40° C. The obtained emulsion polyacrolein is used for other reactions without maturing. 10 parts of this emulsion polyacrolein with a solid content of 20% mol weight 100,000 are mixed with 20 parts of a 10% methanolic potassium hydroxide. Within 1 minute at 20° C. a brown compact gel is formed.

Example 5

The formation of a gel is described from an aqueous solution of polyacrolein with $SO_2$ without maturing.

The polyacrolein/$SO_2$ solution is formed as follows: Into 100 parts of a 20% emulsion polyacrolein formed as described in Example 4 at 20° C. 14 parts by weight $SO_2$ are introduced. Within 24 hours a clear brown solution is formed. This solution is directly usable for the formation of gels without maturing.

10 parts of this polyacrolein/$SO_2$ solution are mixed with 20 parts of a 5% sodium hydroxide. At first a clear thin solution is formed the viscosity of which is rising continuously at 20° C. Within 45 minutes a brown clear gel is formed from this mixture. This gel is very soft and has therefore a certain flowing capacity.

Example 6

10 parts of an aqueous polyacrolein/$SO_2$ solution the preparation of which is described in Example 5, are mixed with 20 parts of a 10% sodium hydroxide. Within 3 minutes a brown clear gel is formed which has no flowing capacity but holds the form.

Example 7

10 parts of an aqueous polyacrolein/$SO_2$ solution the preparation of which is described in Example 5, are mixed at 20° C. with 10 parts of a 30% solution of sodium hydroxide. Within 30 seconds a brown compact gel is formed.

Example 8

The formation of a gel is described from an aqueous solution of polyacrolein/sodium bisulfite without maturing.

The polyacrolein/$NaHSO_3$ solution is prepared as follows: In 100 parts of 20% emulsion polyacrolein prepared as described in Example 4, 11.5 parts of sodium bisulfite are dissolved and heated to 95° C. for 1 hour. A clear yellowish solution is obtained which can be used for the formation of a gel without maturing.

10 parts of this polyacrolein/$NaHSO_3$ solution are mixed with 10 parts of a 20% aqueous solution of ammonia. Within 1 minute a clear transparent only a little yellowish coloured gel is formed. The gel is holding the form and of tough nature.

Example 9

10 parts of the polyacrolein/$NaHSO_3$ solution the preparation of which is described in Example 8, are mixed with 10 parts of a 20% aqueous solution of piperidine. Instantly a brown compact gel is formed.

Example 10

10 parts of the polyacrolein/$NaHSO_3$ solution the preparation of which is described in Example 8, are mixed with 20 parts of a 20% aqueous solution of potassium carbonate. Instantly a loose pulp of yellowish coloured gel particles is formed.

Example 11

10 parts of the polyacrolein/$NaHSO_3$ solution the preparation of which is described in Example 8, are mixed with 20 parts of a 20% suspension of calcium hydroxide in water. Within 30 seconds a yellowish coloured gel pulp is formed.

Example 12

10 parts of the polyacrolein/$NaHSO_3$ solution the preparation of which is described in Example 8, are mixed with 10 parts of a 20% aqueous solution of ethylene diamine. Within 1 minute at 20° C. a brown compact gel is formed.

Example 13

10 parts of the polyacrolein/$NaHSO_3$ solution the preparation of which is described in Example 8, are mixed with 10 parts of a 20% aqueous solution of tert. sodium phosphate. Instantly a thick pulp of yellowish gel particles is formed.

Example 14

The formation of a gel is described from a solution of a polyacrolein in aqueous $SO_2$ which must be matured for the formation of a gel.

The polyacrolein is prepared as follows: 30 parts of acrolein are homogenized by stirring in 70 parts of water and 0.2 part of piperidine are added at 20° C. Within 2 minutes the temperature rises to 85° C. At the same time the polyacrolein is precipitated. It is filtered with water and for the formation of the $SO_2$ solution used as water containing product.

100 parts of this polyacrolein mol weight 3,000 with a solid content of 20% are saturated by introducing of 14 parts by weight of $SO_2$. Within 3 to 4 days a solution is formed from this at 20° C. The freshly produced polyacrolein solution reacts with sodium hydroxide under formation of a solution. In case the freshly produced polyacrolein/$SO_2$ solution is matured for 4 weeks at 25° C. this solution is rising in viscosity and is now suitable for the preparation of a gel under the same reaction conditions at which without maturing preparation of solution takes place.

10 parts of this matured polyacrolein/$SO_2$ solution are mixed at 20° C. with 10 parts of a 20% solution of sodium hydroxide. Within 2 minutes a clear compact gel is formed.

Example 15

The polyacrolein usable for the reaction is prepared as follows:

65 parts of acrelein dissolved in 320 parts of distilled water are polymerized 3 hours at 25° C. with a catalyst system dissolved in the water, consisting of 1.9 parts potassium persulfate and 1.2 parts silver nitrate. The polyacrolein is filtered, washed with distilled water and used for further reactions as a moist product. This polyacrelein has a mol weight of 30,000.

The preparation of the $SO_2$ solution is carried out in the same manner as described in Example 14.

10 parts of the freshly produced polyacrolein/$SO_2$ solution with a content of 17% of polyacrolein with a mol weight of 30,000 and 8% $SO_2$ are mixed with 20 parts of a 20% aqueous solution of a sodium hydroxide at 20° C. A brown coloured solution is obtained.

Example 16

The polyacrolein/$SO_2$ solution described in Example 15 with a content of 17% polyacrolein mol weight of 30,000 and 8% $SO_2$ is heated to 70° C. for 1 hour for maturing. The viscosity of the solution is increasing.

10 parts of this matured $SO_2$ solution are mixed with 20 parts of a 20% aqueous solution of sodium hydroxide at 20° C. Within 1 minute a brown compact gel is formed.

Example 17

10 parts of the matured polyacrolein/$SO_2$ solution as described in Example 16 are mixed at 20° C. with 10 parts of a 20% aqueous solution of ethylene diamine. Within 1 minute a clear compact gel is formed.

Example 18

10 parts of the matured polyacrolein/$SO_2$ solution as described in Example 16 are mixed with 20 parts of a 20% aqueous solution of piperidine at 20° C. Within 1 minute a brown compact gel is formed.

Example 19

10 parts of the matured polyacrolein/$SO_2$ solution as described in Example 16 are mixed with 10 parts of a 20% aqueous solution of ammonia at 20° C. Within 30 minutes a clear transparent compact gel is formed. This gel is only slightly yellowish coloured.

Example 20

The formation of a gel is described from a solution of a polyacrolein in aqueous $SO_2$ which must be matured for the formation of a gel. The polyacrolein is formed as follows: Into 100 parts of acrolein a slow gas stream of $SO_2$ is introduced for 5 minutes. The temperature increases from 20 to 35° C. and the formed polyacrolein having a mol weight of 30,000 is precipitated within 2 hours. It is filtered and washed with water. The water containing polyacrolein is used for the preparation of a polyacrolein/$SO_2$ solution as described in Example 6.

The freshly produced polyacrolein/$SO_2$ solution does not react with the aqueous solution of sodium hydroxide under formation of a gel but a solution is formed only. To yield a gel formation a maturing process is carried out. The polyacrolein/$SO_2$ solution is heated under stirring for 2 hours at 50° C.

10 parts of this matured polyacrolein/$SO_2$ solution are mixed at 20° C. with 3 parts of a 20% aqueous solution of ammonia. Within 1 hour a clear compact gel is formed.

Example 21

The formation of a gel is described from a solution of a polyacrolein in aqueous $SO_2$ which must be matured for the formation of a gel. The polyacrolein is formed as follows: 10 parts of sodium bisulfite dissolved in 20 parts of water are added dropwise at 20° C. under stirring to 70 parts of acrolein. Within 4 minutes the temperature rises to 65° C. and a clear viscous solution is formed. After cooling to 20° C. 40 parts of aqueous $SO_2$ are added. The mol weight of the polyacrolein is 5,000.

This polyacrolein/$SO_2$ solution does not form gels with basic reacting products. To yield a gel formation the mixture has to stand at 25° C. for 6 weeks. By this maturing process the polyacrolein/$SO_2$ solution becomes able to form gels with basic substances.

10 parts of this matured polyacrolein/$SO_2$ solution are mixed at 20° C. with 10 parts of a 20% aqueous solution of piperidine. Within 2 minutes a clear compact gel is formed.

Example 21a

This example shows the influence of curing time. To 50 parts polyacrolein the production of which is described in Example 15, were added 2.5 parts by weight of $SO_2$. It is kept for 15 hours at 25° C.

One part of this addition product is mixed with 2 parts of an 10% aqueous solution of sodiumhydroxide. Within 2 minutes a solution is formed.

The above described polyacrolein/$SO_2$ addition product is cured for 15 minutes at 70° C. One part of this matured polyacrolein/$SO_2$ is mixed with 2 parts of a 10% aqueous solution of sodiumhydroxide. Within 2 minutes a solution is formed again.

The above described polyacrolein/$SO_2$ addition product is cured for 30 minutes at 70° C. One part of this matured polyacrolein/$SO_2$ is mixed with 2 parts of a 10% aqueous solution of sodiumhydroxide. Within 2 minutes a pulp of gel particles is formed.

The above described polyacrolein/$SO_2$ addition product is cured for 1 hour at 70° C. One part of this matured polyacrolein/$SO_2$ is mixed with 2 parts of a 10% aqueous solution of sodiumhydroxide. Within 2 minutes a compact gel is obtained.

The above described polyacrolein/$SO_2$ addition product is cured for 2 hours at 70° C. One part of this matured polyacrolein/$SO_2$ is mixed with 2 parts of a 10% aqueous solution of sodiumhydroxide. Not a more compact gel but a gel dispersion is obtained because the curing of the polyacrolein/$SO_2$ is now too much.

The polyacrolein gels obtained by the above described methods may be employed according to the invention for the improvement of the properties and sealing of soils, soil formation, structures, structural elements and structural materials.

Processes are known for the improvement of soils using synthetic polymers. For example, crosstd linked polyacrylamides have been used as soil sealing agents in the form of their water containing gels. According to such process an aqueous solution of monomeric acrylamide is polymerized in combination with a cross-linking agent to form a gel containing a considerable amount of water at the location of use. The gel which is formed by the polymerization within the ground itself can, for example, seal such ground to prevent water penetrating from above from percolating down through such soil. The polyacrylamide gels, however, have the disadvantage that after they have been dried out they cannot again take up water or, in other words, they are irreversible with regard to their swelling properties. This shortcoming is most undesirable for many practical applications.

Soil sealing agents, for example, are used to seal the soil on earth dams of dammed lakes and ponds after they have been preliminarily sealed by the injection of cement in order to provide a completed seal against penetrating water. During periods of great drouth, it often happens that the level of the water behind the dams is lowered considerably and in some instances dries out completely. At the same time the ground water level is lowered considerably. As a consequence, the synthetic resins present in the fissures in the soil as sealing agents dry out to a considerable degree and the shrinkage caused thereby causes substantial loss of the sealing effect attained. Even when the water level again rises after a change of weather or season and the reservoirs behind the dams are again filled with water, the dried gels produced by the previously known procedures are no longer in the position to take up water and swell up to their original volume and therefore cannot again provide a complete seal in the soil.

The object of the present invention is to provide a means for improving and sealing of soils, soil formations, structures, structural elements and structural materials in which the improving or sealing effects are retained even with large changes in temperature and moisture.

According to the invention it was found that this object could be achieved with the aid of gels of polyacrolein.

Such gels can be incorporated in the materials to be improved and sealed in a number of ways as exemplified by the following:

(1) It is possible to incorporate the gels in situ, for example, by introducing finely divided polyacrolein into the materials concerned and then be caused to form a gel in the presence of an alkali and water. The in situ gel formation can be carried out as a one or two step process. In the one step process the aqueous alkali metal hydroxides are mixed with aqueous dispersions of finely divided polyacroleins, before introduction into the material to be improved or sealed, for example, in a mixing drum or mixing nozzle. In such case care must be taken that any gel formation occurring before introduction of the mixture into the material to be improved or sealed has only proceeded so far that the mixture is still in a flowable condition. In the two step process an aqueous dispersion is first injected into the material concerned and the aqueous alkali metal hydroxide injected thereafter.

(2) Instead of forming the gels in situ as under procedure 1, gels which have been prepared and fully formed outside of the material to be improved and sealed can be used in the form of compact masses. Their methods of preparation are analogous to those employed under procedure 1 but in this instance there is no particular need to vary or control the solidification times. Naturally such gels as produced are free of the materials to be improved or sealed. They can be used either in noncomminuted or in comminuted form, for example, by admixture with the materials to be treated or by tamping them into the earth cracks or porous materials.

(3) In addition to the above two procedures, it is also possible to dry the preformed gels at temperatures up to about 200° C. and add them to the materials concerned as a so-called dry powder. The water which is then supplied thereto is taken up very rapidly by such dried gels and a swollen gel is reformed. The dry substance content of such predried gels is of little consequence. Even predried gels with a dry substance content of only 3% by weight are suitable.

(4) Still a further possibility according to the invention is to employ an aqueous dispersion of particles of the polyacrolein alkali hydroxide gels of varying size depending upon the situation at hand. It is of special advantage that in the preparation of the gel dispersions the particle size may be adapted to fit the situation concerned. For example, compact gel lumps more than 10 cm. long can be employed, for example, when wide coarse cracks in the ground are to be sealed off. On the other hand, the gel particles may be selected to be sufficiently small that they penetrate the small interstices of the ground or the pores of porous clay and there provide a sealing action.

A number of methods are possible for the production of the gel dispersions. For example, upon reaction of an aqueous dispersion or solution of polyacrolein and an aqueous solution of alkali metal hydroxide a viscous solution is first formed which then solidifies to a solid block of gel and such gel block is then ground in a colloid, ball or pigment mill to the desired grain size and dispersed in water.

According to a preferred embodiment, however, the gel dispersions are prepared by preventing a complete solidification of the gel solution during the gel production by intensive stirring so that a dispersion of gel particles in the aqueous medium is produced directly instead of the solid block. Such dispersion can then be diluted with water to the desired solids content. Smaller or larger particles are produced depending upon the stirring velocity. With high stirring speeds the gel particles are smaller and can be down to colloidal particles and conversely with slower stirring speeds larger gel particles of up to more than 10 cm. in length can be obtained.

The aqueous gel dispersions employed in general contain a relatively small quantity of the dispersed gel particles. In most instances dispersions with a 1 to 5% by weight solids content suffice for sealing purposes. Dispersions of a lower concentration of only about 0.1 to 0.5% by weight can be used in connection with finely pored material, such as, loose fine sand. Of course, it is also possible to use dispersions with a solids content of over 5% by weight but these are more difficult to handle technically.

As the gel dispersions are stable and therefore capable of being transported it is not necessary that they be prepared at the locus of use. It is also possible to obtain them in fully neutralized state by neutralization of the excess alkali with acids. When the neutralization, for example, is carried out with nitric acid, the nitrate formed firmly adheres to the gel particles and the thus produced gel dispersions can be used as a fertilizer.

The gel dispersions, as a one component system, can be handled especially easily not only by direct introduction into ground formations or construction material mixtures used in the construction of structural elements but also in the subsequent sealing of structures, structural elements, road surfaces, road surface coatings and dressings.

For example, the sealing can be carried out in a simple manner, that is, for instance, by simple admixture or introduction with an injector or by pouring the gel dispersions on large surfaced elements or in the case of shaped bodies such as building blocks or wood shapes by dipping them into the dispersions.

When the dispersions are poured on large flat surfaces a thick layer of gel particles is produced thereon which takes up and holds water from the atmosphere with swelling and prevents a further permeation. Complete drying of the layer therebelow is thereby prevented. This can be of considerable interest in the fields of construction and agriculture. Such a closed layer of gel particles need only be 1 mm. thick to provide a complete seal against water.

When these gel dispersions are admixed with construction mixtures which have a tendency to tension cracks such as, for example, cement mixtures it was found that the quantity of water added can in the presence of the gel dispersion be 20 to 30% higher than previously. Because of this large quantity of water the setting process proceeds in such a way that the formation of tension cracks is avoided even at high atmospheric temperatures.

On the other hand, when the larger quantities of water are not employed, for example, in concrete mixtures, such mixtures have a higher flow consistency because of the presence of the gel dispersions and therefore have a reduced tendency to escape from the forms in which they are to be cured. Such concrete mixtures after setting instead of having a powdery surface have a hard smooth surface which is resistant to abrasion.

In general, the gels employed for the preparation of the dispersions already possess a high water content, for example, up to 90% by weight before being dispersed. In some instances, however, it can be advantageous to dry such gels partially to a dry substance content of 50–70% by weight before being dispersed. Upon access to water they are again swollen to their full size. They also can be mixed with other dry substances such as fertilizers or strengthening substances such as cement and used for sealing purposes in this form.

The gel dispersions according to the invention as already indicated are also of interest in agriculture. For example, the growth of plants (short and long rooted plants) can be regulated by working in such dispersions at definite depths of the soil. Also when poured on the soil plants can be completely irradicated, for example, for weed control.

The gel formation according to the invention can be carried out at a temperature within the range of −10 and +100° C. but in general a temperature between +5 and 50° C. is employed. The height of the pressures employed is inconsequential for the purposes of the invention.

The possibility of regulating the period required for the solidification of the gels within wide limits is of substantial advantage in the first procedure described above. This is of special importance as too early initiation of the gel formation during introduction of the gel forming polyacrolein and alkali metal hydroxide components into the materials to be improved or sealed can easily lead to clogging of the pores or channels within such materials which renders it difficult to introduce further quantities and often prevents complete penetration of the material being treated with the gel forming medium.

Although the gel formation does not occur suddenly but proceeds over a stepwise increase in viscosity, the total time required can be rather short.

The time required for the solidification of the gel depends upon the polymer selected as well as the water content of the mixture of the polymer dispersion and alkali metal hydroxide solution.

Polyacrolein or copolymers of acrolein may be converted by an ageing treatment to a form in which gel formation with aqueous alkali metal hydroxide solutions requires a longer period of time than with an unaged polymer or copolymer. A rough adjustment of the solidification time can therefore be effected by suitable selection of an aged polymer or copolymer.

If the solidification time is to be varied or lengthened still further a predetermined quantity of water or dilute aqueous acid can be added to a preformed but still liquid mixture of the polyacrolein dispersion or solution and alkali metal hydroxide solution after an initial period after formation of such mixture which can be determined experimentally. The solidification period can be varied thereby depending upon the quantity of diluent added. However, in any event, the quantity of water added should not be such that the dry substance content of the mixture produced thereby is substantially below 1%.

The selection of the polymer of acrolein, the ageing of such polymer as well as the dilution of the reactant polyacrolein and alkali metal hydroxide mixture render it possible to adjust the solidification periods to such an extent that it can be satisfactorily adjusted for practically all situations which might occur.

The gels produced according to the invention are insensitive to temperature. Their swellability also is not reduced after heating to higher temperatures for several hours. Even when they are heated to temperatures up to 200° C. and above they reswell after addition of water and still possess a very good sealing action.

The gels which have been supplied to the materials to be improved or sealed according to the four procedures described above are insensitive to acid waters (pH of about 4–6) as well as to ammonium, sodium, potassium, calcium, barium, manganese, copper, aluminum, iron ions especially as they occur in soils and soil formations. Their structure and therefore their sealing effect is retained in acid, as well as in lime or clay containing surroundings.

It is furthermore possible to strengthen the gels produced according to procedures 1 and 2 mechanically. For this purpose water glass, water soluble or swellable cellulose or starch derivatives, solid or in solution, polyvinyl alcohol, polymer dispersions, especially of polyvinyl acetate or polyacrylic acid esters and/or highly disperse fillers such as silicic acid, carbon black and the like can be added to the mixture of the polyacrolein dispersion or solution and the alkali metal hydroxide solution during the gel formation.

The present invention is suited as already indicated for the most varied improvement and sealing purposes. Foundation soil for the installation of air and water works, shafts, bore holes as well as soils which are to be used agriculturally including sand soils as well as wandering dunes are considered to be included in the definition of "soils and soil formations." Air and water works including the installations for water courses, canals, river improvements or the recovery of new land are considered to be included in the definition of "structures." In addition to mortars of all types also ornamental and coating materials as well as asphalt, asbestos and wood are considered to be included in the definition of "structural materials." Bricks, building blocks and stones, girders, roofs, partitions, masonry walls are considered to be included within the definition of "structural elements." The gels can be used as such or in combination with cement or mortar in soils, soil formations, structures, structural elements and structural materials.

Sand, soils, gravel, cement and concrete mixtures which contain the gels mentioned in connection with procedures 1 to 3 above all are suited for the sealing of surfaces, for example, road foundations, water tight dams, subsoils of canals and storage reservoirs. The gel content in these mixtures constitutes at least 0.05 by weight, preferably at least 5% by weight and such mixtures contain only the water bound in the gel.

When partially dried gels are employed in admixture with fertilizers it is possible simultaneously to fertilize sandy soils and at the same time improve their water conservation properties.

The following examples will serve to illustrate the invention with reference to a number of embodiments thereof. In such examples the proportions are given in parts by volume and percent by weight unless otherwise specified.

Example 1

5 parts of an aqueous dispersion of polyacrolein of a molecular weight of 80,000 having a 20% solids content were mixed with 5 parts of a 10% aqueous sodium hydroxide solution and such mixture poured into a mold at 25° C. The originally milky white emulsion mixture gradually transformed to a yellowish brown color and at the same time the emulsion color gradually disappeared while the viscosity of the solution increased. After about 5 minutes measured from the time of admixture, a brownish clear gel was obtained which fully filled the mold without shrinkage. The gel can be swollen further in water but is not soluble in water.

Example 2

5 parts of a cured aqueous polyacrolein/SO₂ solution with a 17% content of polyacrolein of a molecular weight of 1200 and an 8% content of $SO_2$ were mixed with 10 parts of 10% aqueous NaOH. Upon admixture a clear solution of low viscosity was first obtained which gradually increased in viscosity and formed a gel within 10 minutes. Such gel is suited for admixture with sand in the proportions of 1 part gel to 20 parts of sand. Such gel-sand mixture when tamped, vibrated or rolled gave good sealing effects against water.

Example 3

5 parts of an aqueous dispersion of polyacrolein with a 20% solids content were mixed at 20° C. with 10 parts of 10% aqueous NaOH. A brownish clear gel formed within 130 seconds which had sufficient strength and was effective as a sealing agent against water.

In order to increase the time taken for solidification in order to provide time for its use as a soil sealing agent after the preparation of the mixture, a mixture as prepared above was again prepared and after 100 seconds 3.5 parts of water were stirred into such mixture which had in the meantime become viscous. Such addition caused the mixture to remain in a flowable condition longer and gelation only occurred after 7 minutes. When mixtures were prepared under exactly analogous conditions but the quantity of water employed for the dilution was increased from 3.5 parts to 4 parts and 4.5 parts respectively the times required for gelation increased to 15 minutes and 1½–2 hours respectively.

It is possible also to use dilute HCl instead of the diluting water to increase the time required for the gelation. When the mixtures were diluted after 100 seconds with 2 parts of 10% HCl the time required for gelation was extended to 15 minutes.

Example 4

A layer of finely divided building sand 10 cm. high was placed in a glass tube 6 cm. in diameter which was open at the bottom and 22 cc. of an aqueous 20% emulsion polyacrolein (solids content 20%) poured over such layer. After the emulsion polyacrolein penetrated and moistened such sand layer, 25 cc. of aqueous 10% NaOH were poured on. The NaOH solution also penetrated the sand layer and reacted with the emulsion polyacrolein which was present therein with the formation of a gel which rendered the sand layer water tight.

Example 5

0.1 part of highly dispersed silicic acid was distributed in 5 parts of an aqueous dispersion of polyacrolein (as in Example 1) and then 5 parts of aqueous 20% NaOH added thereto. The mixture solidified to a clear yellowish brown gel of increased strength after 1 minute.

Example 6

1 part by weight of a gel containing 7% of converted polyacrolein was mixed with 15 parts by weight of sand and a layer 1 cm. thick built up from such mixture by tamping in an apparatus for determining the permeability coefficient thereof. A column of water 2.5 meters high was placed over such tamped layer. No water passed through such layer in 2 days which indicated that such layer was completely water tight.

Example 7

9 parts of an aqueous dispersion of polyacrolein with a solids content of 20% were diluted with 4.5 parts of water and subsequently 10 parts of aqueous 10% of NaOH added thereto. The resulting mixture was then mixed with 100 parts of sand and a quantity of such sand containing mixture then placed in a wide tube which was open at the bottom of provide a layer having a height about equal to the diameter of the tube and an equally high layer of water placed thereover. The gel which formed in the sand containing layer hindered permeation of such layer by the water and even after several hours' standing no water ran out of the open bottom end of the tube.

When the above described sand/gel mixture was used to build up a layer 0.3 to 0.5 cm. thick over a filter paper in a funnel and such layer allowed to dry for 15 hours and then 100 parts of water placed thereover, despite its thinness, such layer only permitted passage of 50 parts of the water in 5-6 hours.

Example 8

1 part of aqueous emulsion polyacrolein with a 20% solids content was mixed with 2 parts of aqueous 10% NaOH and such mixture allowed to solidify to a gel. The resulting compact gel was mixed with sand and comminuted in a mill.

Example 9

6 parts of an aqueous dispersion of polyacrolein of a 20% solids content were diluted with 6 parts of water and then mixed with 8 parts of aqueous 10% NaOH. The gel which formed within a few minutes was comminuted and dried at 120° C. for 3 hours. The dried residue was ground to a fine powder.

One part of the thus obtained dried gel powder was mixed with 3 parts of water. Within 20 seconds the dried gel powder swelled up to a solid gel.

A glass tube which was open at the bottom and standing in a dish was filled with a 50 cm. high layer of a mixture of 100 parts of sand and 5 parts of the dried gel powder. Thereafter, water was poured over the sand and dried gel mixture to provide a water column thereover which was 50 cm. high. The column of the sand was completely moistened thereby and a portion of the water also flowed out of the bottom of the tube into the dish. However, after 20 minutes the dried gel powder admixed with the sand had swollen to such an extent that a 20 cm. column of the water originally supplied was retained over the sand column and was still retained even after several hours' standing.

In comparison, when water was poured over a column of sand 50 cm. high, which contained no dried gel powder, to provide a water column 50 cm. high thereover, within 20 minutes 5 of such fillings of water passed through the sand column which indicated, as would be expected, that no sealing effect had been attained.

Example 10

A mixture of 24 parts of an aqueous dispersion of polyacrolein of a solids content of 20% and 24 parts of water were introduced into a tube 1.5 meters long and thereafter a layer of 32 parts of an aqueous 10% NaOH introduced thereover. Even with a tube of an inner diameter of 0.8 cm. a complete mixture was attained with the formation of a clear gel over the entire height of the filling.

Example 11

A glass tube open at the bottom was filled with a column of sand 60 cm. high. A mixture of 25 parts of an aqueous dispersion of polyacrolein of a 20% solids content and 25 parts of aqueous 10% NaOH were allowed to run out of an empty smaller glass tube which originally dipped 30 cm. deep into the layer of sand while such smaller glass tube was gradually withdrawn so that the sand was thoroughly moistened with the reaction mixture. Gel formation took place after about 10 minutes. A column of water was immediately placed over the column of sand. The water did not penetrate and a long lasting sealing effect was obtained. The water level did not change even after several days of observation.

The experiment was repeated using sea water in place of the fresh water. The sealing effect remained unchanged even after several weeks' standing.

Example 12

Using the same arrangement as in Example 11 only a layer about 1.5 cm. thick in the middle of the sand column was impregnated with the same reaction mixture as in Example 11. After gelling even this thin layer sufficed to hold back water penetrating the sand column from above for long periods of time.

Example 13

5 parts of an aqueous dispersion of a copolymer of 80 parts by weight of acrolein and 20 parts by weight of vinyl acetate with a K value of 60 and a solids content of 10% were mixed with 10 parts of aqueous 10% NaOH and poured into a mold at 25° C. After about 3 minutes calculated from the time of admixture a brownish slightly cloudy gel formed which was reversibly swellable in water but no longer soluble in water.

Example 14

5 parts of an aqueous dispersion of a copolymer of 75 parts by weight of acrolein and 25 parts by weight of methyl methacrylate of a K value of 65 and a 20% solids content were mixed with 10 parts of aqueous 15% KOH. Within 5 minutes at 25° C. a brown cloudy gel formed which while reversibly swellable in water was not soluble therein.

Example 15

2.5 parts of a 20% aqueous emulsion polyacrolein were mixed while stirring with 25 parts of aqueous 10% NaOH. Within a few seconds at 20° C. a highly viscous dispersion of finely divided gel particles was obtained with disappearance of the emulsion coloration. This finely divided dispersion can be further diluted with water and can be used in this form or after neutralization for sealing purposes.

Example 16

10 parts of a 20% aqueous emulsion polyacrolein were mixed with 5 parts of aqueous 20% NaOH at 20° C. Within a short time a brownish clear gel formed. Such gel was comminuted to fine particles in a mill and equal portions thereof neutralized as follows with aqueous 10% HCl to provide the indicated percentage of neutralization of excess NaOH:

| | Percent of theory |
|---|---|
| (a) | 60 |
| (b) | 70 |
| (c) | 80 |
| (d) | 90 |
| (e) | 100 |

The original non-acid treated gel and the partially neutralized to fully neutralized gels (a) through (e) were each converted to 1%, 3% and 5% gel dispersions by milling in a ball mill with appropriate additions of water. These gel dispersions are to a far-reaching degree stable against sedimentation. If desired, however, wetting agents may be added thereto.

Example 17

10 parts of aqueous 10% NaOH were added to 5 parts of a 20% aqueous emulsion polyacrolein while stirring and the mixture stirred until the gel formation was completed. A finely divided gel pulp was obtained which upon addition of water was converted to a gel dispersion ready for use without the necessity of further comminution. If desired, neutralization can be effected simultaneously with the admixture of the water.

Example 18

Synthetic resin tubes 10 cm. long and 7 cm. in diameter were set up in Petri dishes and filled one-half their height with dry sand. Then the 1%, 3% and 5% gel dispersions (18) produced as in Example 16 were each poured on top of the column of sand in the individual tubes in such quantity that only a layer of the sand 0.5 to 1 cm. thick was moistened therewith. In each case it took only about 1 minute for the dispersions to be taken up by the sand and immediately thereafter the portions of the tubes above the sand columns were filled to the top with water. In each instance it was found that the gel dispersion treatment had caused an immediate completely water tight seal. Even after standing for a number of days the sand column was not penetrated by the water standing thereover and no water reached the Petri dishes.

When these tests were repeated using sand which originally had been completely moistened with water instead of the dry sand the same results were obtained.

Analogously, large areas of soil can be rendered water tight and the simple manner in which the gel dispersions according to the invention may be applied renders them of significance in the construction of reservoirs, for canal systems and river control, as well as for treatment of loose sandy soils to solidify them or render them more suitable for agricultural purposes.

Example 19

(a) A mortar was produced from 100 parts of sand, 50 parts of cement, 5 parts of partially dried polyacrolein gel powder as produced in Example 9 and 40 parts of water and a funnel shape 1 cm. thick built up therefrom on a filter paper in a glass funnel as a mold.

(b) An analogous mortar mixture as in (a) but without the polyacrolein gel powder and with 30 parts of water instead of 40 had the same flow consistency as the mortar mixture (a). A funnel shape was built up with the mortar mixture as in (a).

Both cement shapes (a) and (b) were allowed to dry for 24 hours and then each was filled with 100 cc. of water. All the water had run off from funnel shape (b) with 19 minutes. In the case of funnel shape (a) the slow passage of water therethrough came to a halt after about 1 hour when 55 cc. of the water were still present therein. A lasting water tight seal therefore was obtained by the reversible swellability of the dried gel powder.

Example 20

(a) A mortar mixture was prepared from 100 parts of cement, 200 parts of sand and 75 parts of water and a Petri dish mold filled completely therewith.

(b) 20 parts of sand admixed with 2.5 parts of 20% aqueous emulsion polyacrolein were mixed with 20 parts of sand admixed with 5 parts of aqueous 10% NaOH and the mixture homogenized and allowed to react for 10 minutes at 20° C. to effect the gel formation. Such mixture was then analogously to (a) mixed with the remainder of the 200 parts of sand, 100 parts of cement and 67.5 parts of water to form a mortar. The volume of the emulsion polyacrolein and of the aqueous NaOH, namely, a total of 7.5 parts, was subtracted from the 75 parts of water used in (a). The resulting mortar again was used to fill a Petri dish mold.

(c) Analogously to (b) a mortar mixture was prepared using 5 parts of 20% aqueous emulsion polyacrolein and 10 parts of aqueous 10% NaOH, again with a correspondingly reduced quantity of water of 60 parts, and used to fill a Petri dish mold.

(d) Again analogously to (b) a mortar mixture was prepared with the changed proportions of 52.5 parts of water, 7.5 parts of 20% aqueous emulsion polyacrolein and 15 parts of aqueous 10% NaOH and used to fill a Petri dish mold.

The mortar mixtures (a) through (d) were cured for 24 hours at an ambient temperature of 50–60° C. Many fine tension cracks occurred in the cured control mortar (a) which contained no polyacrolein gel. The surface thereof in addition had a powdery white appearance and was not resistant to wiping. On the other hand no surface cracks occurred in mortars (b) through (d) despite the curing at raised temperatures. In addition the surface of the cured mortars was of better quality, it was not powdery and was resistant to abrasion. In addition as compared to cured mortar (a) the cured mortars of the series (b) through (d) exhibited increasingly better waterproof properties.

Example 21

Dry fine grained building sand was moistened with so much water that a maximum moistend state was reached without having the mixture flow. It was found that this state was reached at a ratio of 86% sand and 14% water.

Parallel to this analogous mixtures were prepared containing small quantities of polyacrolein and in addition small quantities of sodium nitrate produced by neutralization of the gel with nitric acid. The mixtures, the compositions of which are given in the following table, were used to fill 30 x 30 cm. plant boxes which were 4 cm. high and which were provided with a fine meshed wire netting bottom so that excess water could run off. The mixtures were permitted to dry in such boxes at 20–25° C. and periodically the remaining water content checked in the uppermost layer 1 cm. thick by drying 1 hour at 120° C. Whereas after 4 days the water/sand mixture is completely dry the other mixtures still contain the quantities of moisture indicated in the following table in view of the water binding properties of the polyacrolein gels contained therein.

TABLE 1

| Gel content, percent | NaNO₃ content, percent | Water content of the samples, percent | | | |
|---|---|---|---|---|---|
| | | At start | After 1 day | After 2 days | After 4 days |
| ---- | ---- | 14 | 5 | 3 | 0 |
| 0.5 | 1 | 14 | 9 | 8 | 5.5 |
| 0.25 | 0.5 | 14 | 9 | 8 | 5.5 |
| 0.1 | 0.2 | 14 | 9 | 7 | 5.0 |
| 0.05 | 0.1 | 14 | 8 | 6 | 4.5 |

While the sample without the gel addition is without any solid consistency after four days and dusts, those containing the gel cohere firmly and do not dust.

Upon supply of further water to the samples those containing the gel bound about 30% more than the sample of sand alone.

The polyacrolein gel containing sand samples were suited for cultivation of many different varieties of plants and therefore suitable for agricultural usage.

What we claim is:

1. A process for the preparation of a gel from a polymer of acrolein which gel is reversibly swellable in water but not soluble therein which comprises contacting a polymer of acrolein with a molecular weight of at least $1 \times 10^3$ containing at least 0.1 wt. percent of $SO_2$ in the form of at least one of the groups $SO_3H$ and $SO_3M$ which are bonded to the aldehyde groups of the polyacrolein wherein M is selected from the group consisting of alkali metal, alkaline earth metal and ammonium, which polymer of acrolein is obtained by one of the following methods: (1) polymerization of acrolein in an inert medium with the aid of an adduct of a polymer and a sulfurous compound as catalyst, said polymer being selected from the group consisting of polyacrolein, polyguanidine, gelatine, cellulose polyethers and polyvinyl alcohol and having a molecular weight of $1 \times 10^3$ to $2 \times 10^6$ and said sulfurous compound being selected from the group consisting of sulfurous acid, alkali metal bisulfite and alkaline earth metal bisulfites, (2) polymerization of acrolein with gaseous $SO_2$ or $SO_2$ dissolved in an inert medium and curing the polymerization product over a period of time between 30 minutes and 2 weeks at temperatures from about 70° to 20° C. (3) polymerization of acrolein in an inert medium with a catalyst free of $SO_2$ and bisulfites which is selected from the group consisting of radical catalysts and ionic catalysts, after completion of the polymerization contacting the polymerization product in the presence of an inert medium with at least one sulfurous compound selected from the group consisting of $SO_2$, alkali metal bisulfites and alkaline earth metal bisulfites to introduce the required bound $SO_2$ content in the polymerization product and then curing such polymerization product over a period of time between about 30 minutes and 2 weeks at temperatures from about 70° C. to 20° C., in an inert medium with a basic substance, the concentration of the polymer of acrolein in said inert medium being at least 6 wt. percent.

2. The process of claim 1 in which said inert media are selected from the group consisting of at least one material selected from the group consisting of water and lower aliphatic saturated primary alcohols.

3. The process of claim 2 in which said basic substance is selected from the group consisting of alkali metal hydroxides, including ammonium hydroxide, alkaline earth metal hydroxides, alkali metal carbonates, tertiary alkali metal phosphates, mono-amines and diamines.

4. The process of claim 3 in which said polymer of acrolein contacted with the basic substance was obtained by method (1).

5. The process of claim 3 in which said polymer of acrolein contacted with the basic substance was obtained by method (2).

6. The process of claim 3 in which said polymer of acrolein contacted with the basic substance was obtained by method (3).

7. The process of claim 6 in which a radical catalyst in the form of a redox system selected from the group consisting of $K_2S_2O_8/AgNO_3$, $H_2O_2/FeSO_4$,

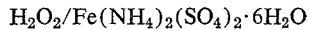

$K_2S_2O_8/Na_2S_2O_3$ and dibenzoyl peroxide/dimethyl aniline is employed.

8. The process of claim 6 in which an ionic catalyst selected from the group consisting of alkali metal hydroxides, including ammonium hydroxide and alkali metal carbonates, is employed.

9. The process of claim 2 in which said polymer of acrolein is uniformly distributed in the inert medium and its content therein is between about 6 and 50 wt. percent.

10. The process of claim 1 in which said polymer of acrolein is a copolymer of acrolein and 0.1 to 50 wt. percent of an ethylenically unsaturated monomer selected from the group consisting of acrylonitrile, acrylamide, styrene, methyl methacrylate and vinyl acetate.

11. A gel which is reversibly swellable in water but not soluble therein having a viscosity of at least $3 \times 10^3$ determined by the Heliopath viscosimeter produced according to the process of claim 1.

12. A gel which is reversibly swellable in water but not soluble therein having a viscosity of at least $3 \times 10^3$ determined by the Heliopath viscosimeter produced according to the process of claim 10.

13. A method of improving the properties of solid water permeable but water insoluble porous materials which comprises incorporating a gel produced according to the process of claim 3 obtained by treatment of a polymer of acrolein with an alkali metal hydroxide in the presence of water which is reversibly swellable with water but insoluble therein in such materials in an effective amount.

14. A method of improving the properties of soil which comprises incorporating a gell obtained by treatment of a polymer of acrolein with an alkali metal hydroxide in the presence of water which is reversibly swellable with water but insoluble therein in such soil in an effective amount.

15. A method of improving the properties of a mortar which comprises incorporating a gell obtained by treatment of a polymer of acrolein with an alkali metal hydroxide in the presence of water which is reversibly swellable with water but insoluble therein in such mortar in an effective amount.

16. The process of claim 13 in which said gel is incorporated in said material in situ by incorporating an ungelled gellable mixture of a polymer of acrolein, water and alkali metal hydroxide in such material and forming the gel with such mixture.

17. The process of claim 16 in which the polymer of acrolein is mixed with an aqueous solution of alkali metal hydroxide and such gel forming mixture incorporated in the material before gel formation has occurred.

18. The process of claim 17 comprising in addition admixing a further quantity of water in the gel forming mixture at a predetermined time after such mixture is formed but before solidification to a gel has occurred to increase the period required for solidification of the mixture to a gel.

19. The process of claim 17 comprising in addition admixing a quantity of dilute aqueous acid in the gel forming mixture at a predetermined time after such mixture is formed but before solidification to a gel has occurred to increase the period required for solidification of the mixture to a gel.

20. The process of claim 16 in which the polymer of acrolein and an aqueous solution of an alkali metal hydroxide are introduced into the material separately and only mixed within said material.

21. The process of claim 16 in which said mixture of acrolein polymer, water and alkali metal hydroxide contains 10 to 90 parts by weight of acrolein polymer and 90 to 10 parts by weight of alkali metal hydroxide.

22. The process of claim 13 in which the gel is incorporated in said material in the form of a gel in pre-pared state.

23. The process of claim 13 in which the gel is incorporated in said material in the form of an aqueous dispersion of the gel in pre-prepared state.

24. The process of claim 23 in which said aqueous dispersion of the gel is formed from a partially dried gel of a 50 to 70% by weight solids content.

25. The process of claim 23 in which such dispersion was neutralized with aqueous nitric acid.

26. The process of claim 13 in which said gel is produced from a mixture of a 5 to 30% by weight aqueous dispersion of a polymer of acrolein and a 3 to 30% by weight aqueous alkali metal hydroxide solution.

27. The process of claim 13 in which said gel is produced from a mixture of an aqueous solution of an adduct of a polymer of acrolein and a sulfurous compound selected from the group consisting of sulfurous acid and alkali metal bisulfites, the concentration of the adduct therein based on the polymer of acrolein being 5 to 30% by weight and a 3 to 30% by weight aqueous alkali metal hydroxide solution.

28. The process of claim 13 in which the gel is introduced into said materials in the form of a predried gel.

29. A mixture of particulate solid water insoluble mineral material and a gel produced according to the process of claim 3 obtained by treatment of a polymer of acrolein with an alkali metal hydroxide in the presence of water which is reversibly swellable in water but not soluble therein containing no water in excess of that which can be bound by such gel.

30. A mixture of soil and a gel produced according to the process of claim 3 obtained by treatment of a polymer of acrolein with an alkali metal hydroxide in the presence of water which is reversibly swellable in water but not soluble therein containing no water in excess of that which can be bound by such gel.

31. A mixture of sand and a gel produced according to the process of claim 3 obtained by treatment of a polymer of acrolein with an alkali metal hydroxide in the presence of water which is reversibly swellable in water but not soluble therein containing no water in excess of that which can be bound by such gel.

32. A mixture comprising cement and a gel produced according to the process of claim 3 obtained by treatment of a polymer of acrolein with an alkali metal hydroxide in the presence of water which is reversibly swellable in water but not soluble therein containing no water in excess of that which can be bound by such gel.

33. A substantially dry mixture of particulate solid water insoluble mineral material and a predried gel produced according to the process of claim 3 obtained by treatment of a polymer of acrolein with an alkali metal hydroxide in the presence of water which is reversibly swellable in water but insoluble therein.

34. A method of reducing the water permeability of a water permeable but water insoluble solid porous substrate which comprises applying a coating of an aqueous dispersion of a gel produced according to the process of claim 3 obtained by treatment of a polymer of acrolein with an alkali metal hydroxide in the presence of water which is reversibly swellable in water but insoluble therein to the surface of such substrate.

References Cited
UNITED STATES PATENTS

| | | |
|---|---|---|
| 3,244,583 | 4/1966 | Fischer et al. |
| 3,268,002 | 8/1966 | Fischer. |
| 3,271,334 | 9/1966 | Kern et al. |

WILLIAM H. SHORT, *Primary Examiner.*

L. M. PHYNES, *Assistant Examiner.*